US012625280B2

(12) United States Patent
Niu

(10) Patent No.: US 12,625,280 B2
(45) Date of Patent: May 12, 2026

(54) UNDERWATER ENVIRONMENT DETECTION DEVICE AND METHOD, FISHING ROD, AND STORAGE MEDIUM

(71) Applicant: GUANGDONG COROS SPORTS TECHNOLOGY JOINT STOCK COMPANY, Dongguan (CN)

(72) Inventor: Haotian Niu, Guangdong (CN)

(73) Assignee: GUANGDONG COROS SPORTS TECHNOLOGY JOINT STOCK COMPANY, Dongguan (CN)

( * ) Notice: Subject to any disclaimer, the term of this patent is extended or adjusted under 35 U.S.C. 154(b) by 106 days.

(21) Appl. No.: 18/403,486

(22) Filed: Jan. 3, 2024

(65) Prior Publication Data

US 2024/0134067 A1 Apr. 25, 2024

Related U.S. Application Data

(63) Continuation of application No. PCT/CN2021/110173, filed on Aug. 3, 2021.

(51) Int. Cl.
*G01S 5/18* (2006.01)
*G01S 19/49* (2010.01)
(Continued)

(52) U.S. Cl.
CPC .............. *G01S 19/49* (2013.01); *A01K 97/00* (2013.01)

(58) Field of Classification Search
CPC . G01S 19/49; G01S 19/14; G01S 5/18; A01K 97/00; G05D 1/02
See application file for complete search history.

(56) References Cited

U.S. PATENT DOCUMENTS

2007/0106462 A1* 5/2007 Blain et al. .............. G05D 1/10
701/518
2021/0016862 A1* 1/2021 Lee .......................... B63C 11/00

FOREIGN PATENT DOCUMENTS

CN 101218904 A 7/2008
CN C207181664 U * 9/2017 ........... G01C 21/165
(Continued)

OTHER PUBLICATIONS

International Search Report for PCT Application No. PCT/CN2021/110173, dated May 5, 2022 (6 pages).

*Primary Examiner* — Helal A Algahaim
(74) *Attorney, Agent, or Firm* — Michael Best & Friedrich LLP

(57) ABSTRACT

Provided are an underwater environment detection device and method, a fishing rod, and a storage medium. The underwater environment detection method is applied to the underwater environment detection device, where the underwater environment detection device includes a control apparatus and a detection apparatus, the control apparatus is configured to execute the underwater environment detection method, and the underwater environment detection method includes: acquiring motion information and dynamic position information of the underwater environment detection device detected by the detection apparatus; determining initial position information based on the motion information and the dynamic position information; determining, according to the dynamic position information and the initial position information, dynamic relative position information of the underwater environment detection device relative to an initial position; determining water situation information; and associating the water situation information with the dynamic relative position information to determine underwater environments at different positions.

19 Claims, 4 Drawing Sheets

(51) Int. Cl.
    *G05D 1/00*        (2024.01)
    *A01K 97/00*        (2006.01)

(56)            References Cited

FOREIGN PATENT DOCUMENTS

| CN | 107795854 A | | 3/2018 | |
| CN | 207181664 U | | 4/2018 | |
| CN | 107980740 A | | 5/2018 | |
| CN | 108490933 A | * | 9/2018 | ............ A01K 97/00 |
| CN | 111523441 A | | 8/2020 | |
| JP | 2019153274 A | | 9/2019 | |
| WO | 2016197723 A1 | | 12/2016 | |

* cited by examiner

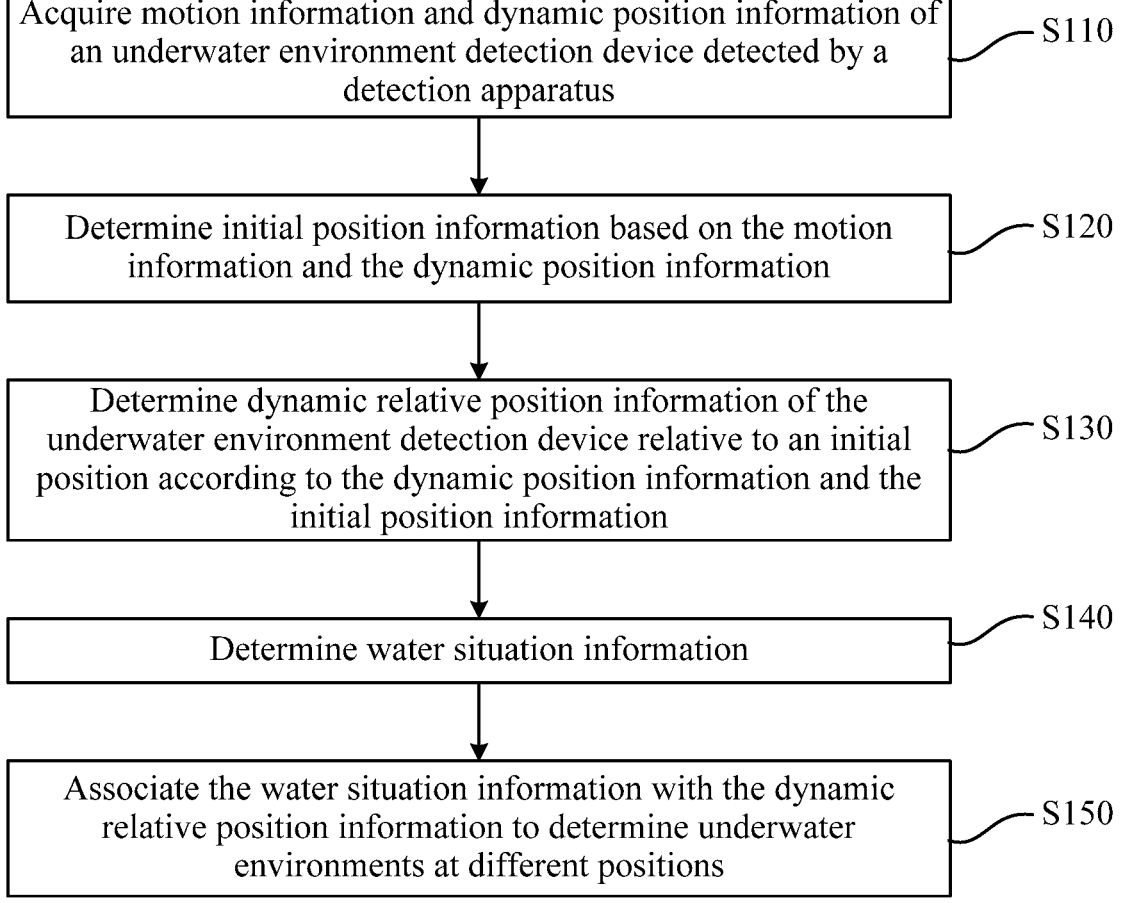

Acquire motion information and dynamic position information of an underwater environment detection device detected by a detection apparatus — S110

Determine initial position information based on the motion information and the dynamic position information — S120

Determine dynamic relative position information of the underwater environment detection device relative to an initial position according to the dynamic position information and the initial position information — S130

Determine water situation information — S140

Associate the water situation information with the dynamic relative position information to determine underwater environments at different positions — S150

FIG. 1

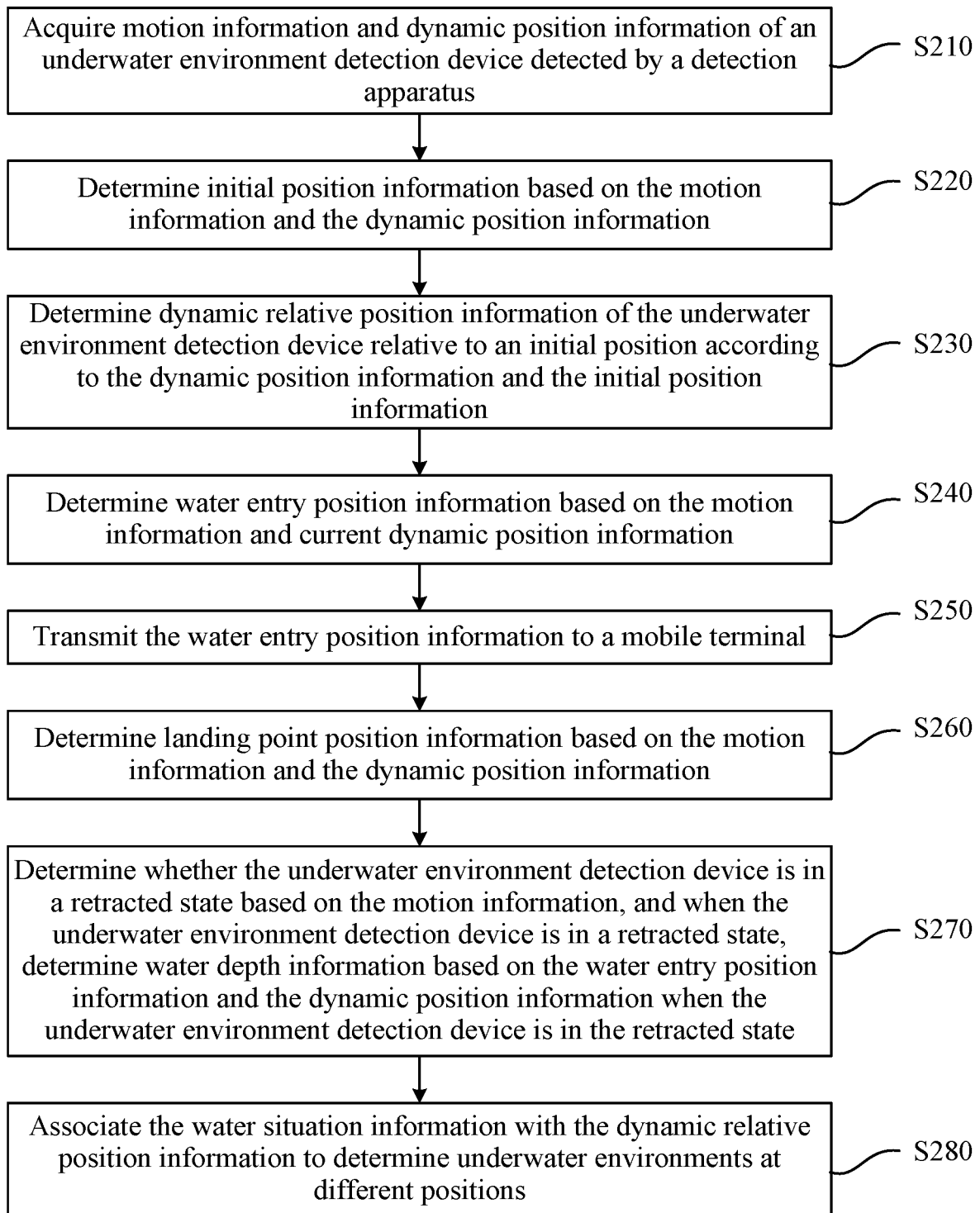

Acquire motion information and dynamic position information of an underwater environment detection device detected by a detection apparatus ⟋ S210

Determine initial position information based on the motion information and the dynamic position information ⟋ S220

Determine dynamic relative position information of the underwater environment detection device relative to an initial position according to the dynamic position information and the initial position information ⟋ S230

Determine water entry position information based on the motion information and current dynamic position information ⟋ S240

Transmit the water entry position information to a mobile terminal ⟋ S250

Determine landing point position information based on the motion information and the dynamic position information ⟋ S260

Determine whether the underwater environment detection device is in a retracted state based on the motion information, and when the underwater environment detection device is in a retracted state, determine water depth information based on the water entry position information and the dynamic position information when the underwater environment detection device is in the retracted state ⟋ S270

Associate the water situation information with the dynamic relative position information to determine underwater environments at different positions ⟋ S280

FIG. 2

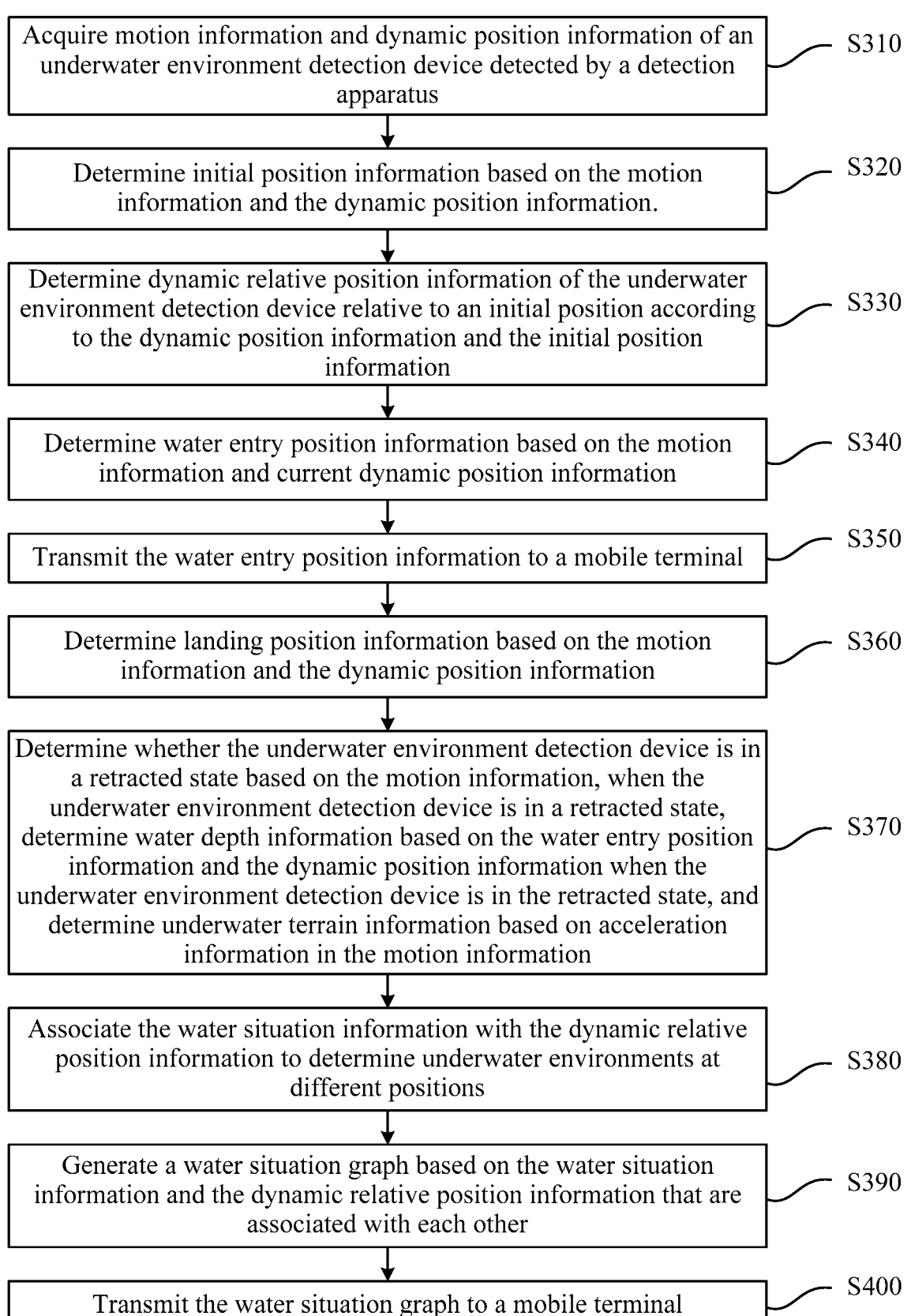

Acquire motion information and dynamic position information of an underwater environment detection device detected by a detection apparatus — S310

Determine initial position information based on the motion information and the dynamic position information. — S320

Determine dynamic relative position information of the underwater environment detection device relative to an initial position according to the dynamic position information and the initial position information — S330

Determine water entry position information based on the motion information and current dynamic position information — S340

Transmit the water entry position information to a mobile terminal — S350

Determine landing position information based on the motion information and the dynamic position information — S360

Determine whether the underwater environment detection device is in a retracted state based on the motion information, when the underwater environment detection device is in a retracted state, determine water depth information based on the water entry position information and the dynamic position information when the underwater environment detection device is in the retracted state, and determine underwater terrain information based on acceleration information in the motion information — S370

Associate the water situation information with the dynamic relative position information to determine underwater environments at different positions — S380

Generate a water situation graph based on the water situation information and the dynamic relative position information that are associated with each other — S390

Transmit the water situation graph to a mobile terminal — S400

FIG. 3

UNDERWATER ENVIRONMENT DETECTION DEVICE AND METHOD, FISHING ROD, AND STORAGE MEDIUM

CROSS-REFERENCE TO RELATED APPLICATIONS

This application is a continuation of International Patent Application PCT/CN2021/110173, filed on Aug. 3, 2021, the disclosure of which is incorporated herein by reference in its entirety.

TECHNICAL FIELD

Embodiments of the present application relate to water environment detection technology, for example, to an underwater environment detection device and method, a fishing rod, and a storage medium.

BACKGROUND

In the case of fishing, rescue, diving, and the like, it is necessary to know the underwater environment of the target water area. The underwater environment of the target water area includes underwater terrain, water depth distribution, water temperature distribution, water pressure distribution, and oxygen content distribution of the target water area. For example, for fishing, if the underwater environment of the target water area is known, the fishing situation can be correctly determined, and the fishing tools, the bait, and the fishing technique can be accordingly determined.

SUMMARY

The embodiments of the present application provide an underwater environment detection device and method, a fishing rod, and a storage medium to develop a manner that is compact, light, low-cost, portable, and easy to operate.

In a first aspect, the embodiments of the present application provide an underwater environment detection method that is applied to an underwater environment detection device. The underwater environment detection device includes a control apparatus and a detection apparatus, and the control apparatus is configured to execute the underwater environment detection method. The underwater environment detection method includes the following steps.

Motion information and dynamic position information of the underwater environment detection device detected by the detection apparatus are acquired.

Initial position information is determined based on the motion information and the dynamic position information.

Dynamic relative position information of the underwater environment detection device relative to the initial position is determined according to the dynamic position information and the initial position information.

Water situation information is determined.

The water situation information is associated with the dynamic relative position information to determine underwater environments at different positions.

In a second aspect, the embodiments of the present application further provide an underwater environment detection device. The underwater environment detection device includes a control apparatus and a detection apparatus.

The detection apparatus is configured to detect motion information and dynamic position information of the underwater environment detection device.

The control apparatus is configured to execute the underwater environment detection method in any of the embodiments of the present application.

In a third aspect, the embodiments of the present application further provide an underwater environment detection system which comprising an underwater environment detection device, and at least one processor, and a memory, wherein the memory is used to store a computer program, the at least one processor is used to execute the computer program, to implement the underwater environment detection method described above.

In a fourth aspect, the embodiments of the present application further provide a non-transitory computer-readable storage medium. The computer-readable storage medium is configured to store a computer program, and the computer program, when executed by a processor, implements the underwater environment detection method described above.

BRIEF DESCRIPTION OF DRAWINGS

FIG. 1 is a flowchart of an underwater environment detection method according to an embodiment of the present application;

FIG. 2 is a flowchart of an underwater environment detection method according to another embodiment of the present application;

FIG. 3 is a flowchart of an underwater environment detection method according to another embodiment of the present application;

REFERENCE LIST

Figure 4:
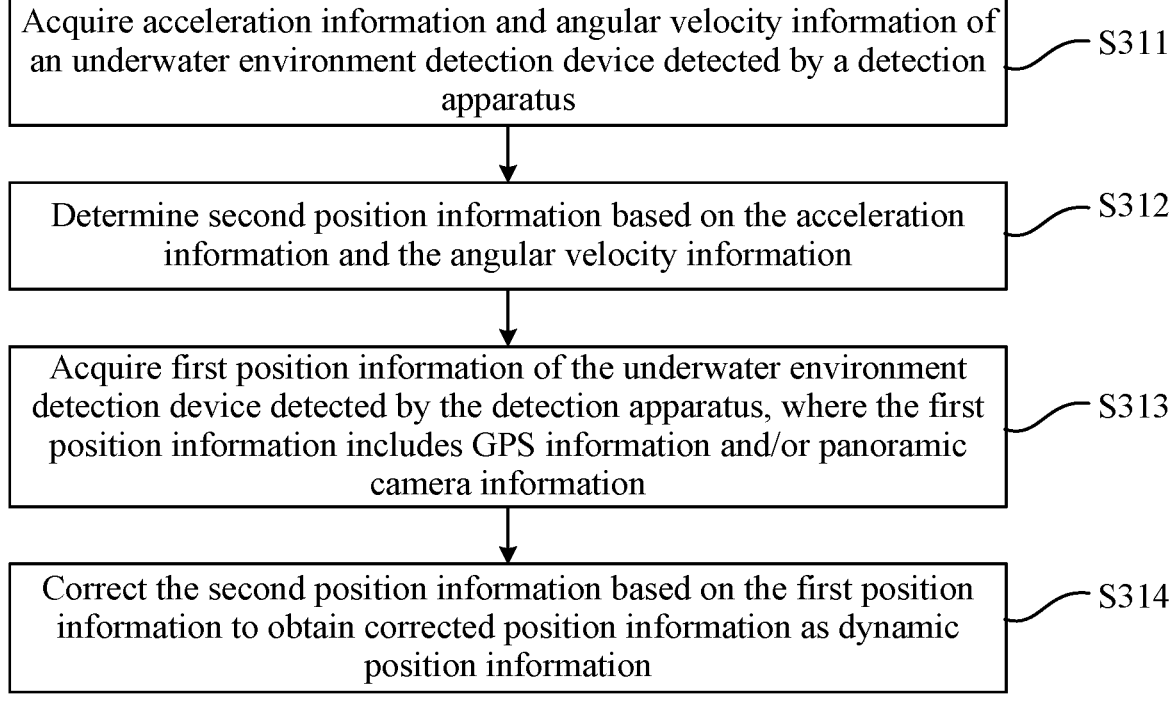
FIG. 4 is a flowchart of step S310 of the underwater environment detection method provided in FIG. 3.

61. control apparatus; 62. detection apparatus; 63. power supply apparatus; 64. communication apparatus.

DETAILED DESCRIPTION

Most of the underwater environment detection devices in the market adopt sonar detection equipment, and such equipment is expensive, large in size, inconvenient to carry, and cumbersome in operation during fishing. In order to enable the sonar detection equipment to reach the target water area, the sonar detection equipment is required to be used in conjunction with other carrying equipment, thereby increasing the equipment carrying capacity during fishing. Further, the sonar detection equipment transmits sound waves and then detects the target area in accordance with the propagation and reflection characteristics of the sound waves in the water, and when multiple sound wave sources are present in the target area, for example, when other ships approach, the sonar detection equipment is prone to be interfered with. In addition, since the sonar detection equipment needs to transmit and receive acoustic signals in real time, the sonar detection equipment usually consumes power quickly and requires frequent replacement of the power supply, thereby increasing the use cost of the equipment.

Therefore, when the sonar detection equipment is adopted to detect the underwater environment, there are problems of high cost, large size, carrying inconvenience, and cumbersome operation.

The embodiments of the present application provide an underwater environment detection device and method, a fishing rod, and a storage medium to better cope with the above-mentioned problems.

The present application is described below in conjunction with drawings and embodiments.

FIG. 1 is a flowchart of an underwater environment detection method according to an embodiment of the present application. This embodiment is applicable to fishing, rescue, diving, and the like. The method may be executed by an underwater environment detection device. The underwater environment detection device includes a control apparatus 61 and a detection apparatus 62. The control apparatus 61 is configured to execute the underwater environment detection method. The underwater environment detection method includes steps S110 to S150.

In S110, motion information and dynamic position information of the underwater environment detection device detected by the detection apparatus are acquired.

The detection apparatus 62 refers to an apparatus having a detecting function, and in some embodiments, the detecting function may be achieved multiple sensors. The motion information refers to at least one piece of motion parameter information, such as acceleration information and angular velocity information, of the underwater environment detection device during motion. The dynamic position information refers to the position information of the underwater environment detection device at different time points during motion.

In S120, initial position information is determined based on the motion information and the dynamic position information.

The initial position may be a starting position at which the underwater environment detection device starts to detect, and whether the detection needs to be started may be determined based on the motion information during use. When the detection is started, the current dynamic position information is the initial position information, and the initial position information may be determined based on the motion information and the dynamic position information.

In S130, dynamic relative position information of the underwater environment detection device relative to the initial position is determined according to the dynamic position information and the initial position information.

The dynamic relative position information refers to the relative positions of the underwater environment detection device relative to the initial position at different time points during the motion of the underwater environment detection device.

In S140, water situation information is determined.

The water situation information refers to at least one type of underwater environmental information, such as underwater terrain information, water depth information, water temperature information, water pressure information, and oxygen content information.

In S150, the water situation information is associated with the dynamic relative position information to determine underwater environments at different positions.

Since the dynamic relative position information refers to the relative positions of the underwater environment detection device relative to the initial position at different time points during the motion of the underwater environment detection device and the water situation information can reflect the underwater environment, the underwater environments at different positions can be obtained by associating the water situation information with the dynamic relative position information.

In the embodiments of the present application, the underwater environment detection device includes a control apparatus 61 and a detection apparatus 62, and the control apparatus 61 can determine initial position information according to the motion information and the dynamic position information of the underwater environment detection device detected by the detection apparatus 62, determine dynamic relative position information of the underwater environment detection device relative to the initial position, determine water situation information, and associate the water situation information with the dynamic relative position information to determine underwater environments at different positions. In the embodiments of the present application, the user can know the underwater environments at different positions only by performing a single operation to operate the underwater environment detection device into the water, and the operation is simple. Meanwhile, the underwater environment detection device only includes the control apparatus 61 and the detection apparatus 62 and thus is compact, light, low-cost, portable, and easy to operate.

In another embodiment, the underwater environment detection device and the underwater environment detection method are applied to a fishing scenario. The underwater environment detection device is installed at the fishing hook or the end of the fishing line, and then the fishing hook is cast into the water. At this point, the underwater environment detection device and the end of the fishing line are also cast into the water. Since the underwater environment detection device is subjected to a casting force from the user when the user casts the fishing hook, the detection apparatus 62 of the underwater environment detection device can know whether the fishing hook is cast by detecting the information on the casting force. At this point, the motion information refers to information that can reflect the casting force from the user, and the initial position refers to the position at which the user starts to cast the fishing hook. After the fishing hook is cast into the water, the fishing hook reaches the bottom of the water under the force of gravity, the underwater environment detection apparatus also falls to the bottom of the water, and the underwater detection apparatus moves along the bottom of the water when the user retracts the fishing hook. When the underwater environment detection apparatus moves along the bottom of the water, the water situation information can be acquired, and the relative position of the underwater environment detection apparatus relative to the initial position can reflect the relative position of the fishing hook relative to the user, that is, the dynamic relative position information reflects the dynamic relative position of the fishing hook and the user. Since the water situation information is associated with the dynamic relative position information, the user can know the underwater water situation information at different positions with the user himself as the starting point, thereby allowing the user to fish according to his needs.

In some embodiments, the underwater environment detection device and the underwater environment detection method may also be applied to other scenarios, such as rescue, diving, and the like. At this point, the underwater environment detection can be achieved by connecting the underwater environment detection device to a component capable of being cast and retracted. For example, the underwater environment detection device can be connected to one end of a rope, the user holds the other end of the rope, casts the underwater environment detection device into the water, and pulls the other end of the rope to retract the underwater environment detection device.

In the embodiment described above, the underwater environment detection device includes a control apparatus 61 and a detection apparatus 62, and the control apparatus 61 can determine initial position information according to the motion information and the dynamic position information of the underwater environment detection device detected by the detection apparatus 62, determine dynamic relative position information of the underwater environment detection device relative to the initial position, determine water situation information, and associate the water situation information with the dynamic relative position information to determine underwater environments at different positions. Meanwhile, the underwater environment detection device only includes the control apparatus 61 and the detection apparatus 62 and thus is compact, light, low-cost, portable, and easy to operate.

In an embodiment, the water situation information includes at least one of: underwater terrain information, water depth information, water temperature information, water pressure information or oxygen content information.

The underwater terrain information may include the underwater terrain trend information and composition information of the bottom of the water, and the composition information includes sediment, mud, gravel, hard bottom or rock.

In an embodiment, the step where the initial position information is determined based on the motion information and the dynamic position information includes the following steps.

Whether the motion information is greater than a preset start value is determined.

In response to determining that the motion information is greater than the preset start value, current dynamic position information is set to the initial position information.

In response to determining that the motion information is less than or equal to the preset start value, the step of determining whether the motion information is greater than the preset start value continues to be executed.

Since the underwater environment detection device needs to enter the water during detection, when the underwater environment detection device is cast to enable the underwater environment detection device to enter the water, a force is applied to the underwater environment detection device, and the underwater environment detection device is nearly in a static state when the underwater environment detection device is not in use. The preset start value refers to a value that can reflect the start of the motion of the underwater environment detection device, and the preset start value may be different when the type of the motion information is different. For example, when the motion information used for determination includes acceleration information, the preset start value is accordingly an acceleration value.

When the motion information is greater than the preset start value, it indicates that the underwater environment detection device starts to move, and at this point, the position at which the underwater environment detection device is located is the initial position. Therefore, the current dynamic position information can be set as the initial position information. In this manner, whether the underwater environment detection device starts to move can be conveniently determined to start the detection process.

In an embodiment, the motion information includes acceleration information.

The step where whether the motion information is greater than the preset start value is determined includes the following step: whether a change amount of the acceleration information is greater than the preset water entry threshold is determined.

The acceleration information refers to the acceleration of the underwater environment detection device. Since the underwater environment detection device needs to enter the water during detection, when the underwater environment detection device is cast to enable the underwater environment detection device to enter the water, a force is applied to the underwater environment detection device. At this point, the underwater environment detection device starts to move only when the underwater environment detection device has an initial acceleration. Therefore, by determining whether the acceleration information of the underwater environment detection device is greater than a preset start value, whether the detection is stated can be conveniently determined.

On the basis of the embodiments described above, the motion information further includes angular velocity information.

The step where the motion information and the dynamic position information of the underwater environment detection device detected by the detection apparatus 62 are acquired includes the following steps.

Acceleration information and angular velocity information of the underwater environment detection device detected by the detection apparatus 62 are acquired.

The dynamic position information is determined based on the acceleration information and the angular velocity information.

For example, the displacement change amounts $S_n$ at different time points N equal to $V_n \times (T_n - T_{n-1})$, where $S_n$ denotes the displacement at the time point N, $V_n$ denotes the velocity at the time point N, and $T_n$ and $T_{n-1}$ denote the time point N and the time point N−1, respectively. $V_n = G_n \times (T_n - T_{n-1})$, where $G_n$ denotes the acceleration value at the time point N. The displacement change amount in each of directions X\Y\Z is calculated in the same manner. The displacement change amount in each of directions X\Y\Z corresponds to the acceleration value in each of directions X\Y\Z and a calculated velocity value. Therefore, the displacement at different time points N can be obtained based on the acceleration information.

The angular velocity information refers to the angular velocity of the underwater environment detection device. Assuming that the angular velocity is Ω, the motion directions an at different time points N equal to $\Omega \times (T_n - T_{n-1})$, and the calculation of the angular change in each of directions X\Y\Z is the same. The displacement change amount in each of directions X\Y\Z corresponds to the angular velocity value in each of directions X \Y\Z, and therefore, the motion directions of the underwater environment detection device at different time points can be obtained based on the angular velocity.

The displacement change amount at each time point relative to the previous time point can be obtained based on the acceleration information, and the motion direction at each time point can be obtained based on the angular velocity information. Therefore, by combining the acceleration information and the angular velocity information, the trajectory information of the underwater environment detection device during motion can be obtained, and the dynamic position information of the underwater environment detection device can be obtained.

In some embodiments, the dynamic position information may also be directly detected by the detection apparatus 62. For example, when the detection apparatus 62 includes one or more of a Global Positioning System (GPS) positioning apparatus and a panoramic camera, the real-time position of the underwater environment detection device may be directly obtained by the detection apparatus 62.

In an embodiment, after the acceleration information and the angular velocity information of the underwater environment detection device detected by the detection apparatus 62 are acquired, the method further includes the following steps.

Geomagnetic information detected by the detection apparatus 62 is acquired, and the angular velocity information is corrected based on the geomagnetic information.

The step where the dynamic position information is determined based on the acceleration information and the angular velocity information includes the following step.

The dynamic position information is determined based on the acceleration information and the corrected angular velocity information.

Geomagnetism, also referred to as the Earth's magnetic field or the geomagnetic field, refers to a magnetic field spatially distributed around the Earth. Since the angular velocity information detected by the detection apparatus 62 may deviate from the actual angular velocity due to the influence of the geomagnetic field, the angular velocity information is corrected based on the geomagnetic information to enable the dynamic position information finally obtained based on the acceleration information and the angular velocity information to be more accurate.

In an embodiment, before the water situation information is determined, the method further includes the following step: whether the underwater environment detection device is in a retracted state is determined based on the motion information.

The retracted state refers to that the underwater environment detection device has been underwater and is moving underwater to return to the initial position. Since the underwater environment detection device is underwater during retraction, the detection apparatus 62 has a detecting function and can determine the water situation information according to the detecting underwater information.

In an embodiment, the step where whether the underwater environment detection device is in a retracted state is determined based on the motion information includes the following steps.

Whether the motion information is greater than a preset retraction value is determined.

In response to determining that the motion information is greater than the preset retraction value, the underwater environment detection device is determined to be in a retracted state.

In response to determining that the motion information is less than or equal to the preset retraction value, the step of determining whether the motion information is greater than the preset retraction value continues to be executed.

The retracted state refers to that the underwater environment detection device has reached the bottom of the water and is being retracted, and at this point, the underwater environment detection device moves a distance along the bottom of the water. When the underwater environment detection device just reaches the bottom of the water, the underwater environment detection device is nearly in a static state. During retraction, the user applies a force to the underwater environment detection device to enable the underwater environment detection device to start to move for retraction. Therefore, by determining whether the motion information is greater than the preset retraction value, whether the underwater environment detection device is in a retracted state can be determined.

For example, the motion information includes acceleration information, and the step where whether the motion information is greater than the preset retraction value is determined includes the following step: whether the acceleration information is greater than the preset retraction value is determined.

When the retraction starts, the underwater environment detection device moves with acceleration. Therefore, by determining whether the acceleration information is greater than the preset retraction value, whether the underwater environment detection device is in a retracted state can be determined.

FIG. 2 is a flowchart of an underwater environment detection method according to another embodiment of the present application. This embodiment of the present application may be based on the embodiment described above.

In an embodiment, before whether the underwater environment detection device is in a retracted state is determined based on the motion information, the method includes the following step: landing point position information is determined based on the motion information and the dynamic position information.

In an embodiment, before whether the underwater environment detection device is in a retracted state is determined based on the motion information, the method includes the following step: water entry position information is determined based on the motion information and the current dynamic position information.

The step where the water situation information is determined includes the following step: water depth information is determined based on the water entry position information and the dynamic position information when the underwater environment detection device is in the retracted state.

In an embodiment, after the water entry position information is determined based on the motion information and the current dynamic position information, the method further includes the following step: the water entry position information is transmitted to a mobile terminal.

As shown in FIG. 2, the method includes the steps S210 to S280.

In S210, motion information and dynamic position information of the underwater environment detection device detected by the detection apparatus are acquired.

In S220, initial position information is determined based on the motion information and the dynamic position information.

In S230, dynamic relative position information of the underwater environment detection device relative to the initial position is determined according to the dynamic position information and the initial position information.

In S240, water entry position information is determined based on the motion information and current dynamic position information.

The water entry position refers to a position at which the underwater environment detection device is just in contact with the surface of the water. The underwater environment detection device first moves in the air, then contacts the surface of the water, and finally reaches the bottom of the water. When the underwater environment detection device just contacts the surface of the water, the surface of the water gives a resistance to the underwater environment detection device, and thus the motion information of the underwater environment detection device has a student change. Whether the underwater environment detection device contacts the surface of the water can be determined based on the motion information, and the water entry position information when the underwater environment detection device enters the water can be obtained based on the current dynamic position information.

In S250, the water entry position information is transmitted to a mobile terminal.

The mobile terminal refers to a computer device that can be used during motion, and the mobile terminal includes a mobile phone, a laptop, a tablet computer, a point of sale (POS) machine and may also include an in-vehicle computer, a smartwatch, a smart bracelet, and smart glasses. By transmitting the water entry position information to the mobile terminal, the user can conveniently obtain the water entry position of the underwater environment detection device through the mobile terminal.

In S260, landing point position information is determined based on the motion information and the dynamic position information.

The landing point position information refers to a position at which the underwater environment detection device lands on the bottom of the water. When the underwater environment detection device has reached the bottom of the water, compared with a state of moving in the water, the underwater environment detection device is nearly in a static state at the moment when the underwater environment detection device reaches the bottom of the water. Therefore, whether the underwater environment detection device is at the landing point can be determined based on the motion information of the underwater environment detection device. Meanwhile, the current landing point position information can be determined based on the dynamic position information of the underwater environment detection device.

In some embodiments applied to the fishing scenario, the underwater environment detection device may be connected to the fishing hook or the end of the fishing line, and the user can conveniently obtain the casting distance through landing point position information.

In S270, whether the underwater environment detection device is in a retracted state is determined based on the motion information, and when the underwater environment detection device is in a retracted state, water depth information is determined based on the water entry position information and the dynamic position information when the underwater environment detection device is in the retracted state.

As described above, when the underwater environment detection device is in the retracted state, the underwater environment detection device moves a certain distance along the bottom of the water, the dynamic position information of the underwater environment detection device at this moment is obtained, the obtained dynamic position information is compared with the water entry position information, and the water depth information at different positions can be obtained so that the user can obtain the underwater situation according to the water depth information.

In S280, the water situation information is associated with the dynamic relative position information to determine underwater environments at different positions.

S250 and S260 described above may be sequentially executed according to the execution procedure in the embodiments described above, that is, the water entry position information is transmitted to the mobile terminal, and then the landing point position information is determined based on the motion information and the dynamic position information. Alternatively, S250 and S260 may be executed simultaneously, that is, the landing point position information is determined based on the motion information and the dynamic position information while the water entry position information is transmitted to the mobile terminal.

For example, the step where the landing point position information is determined based on the motion information and the dynamic position information includes the following steps.

Whether the motion information is less than a preset landing point value is determined.

In response to determining that the motion information is less than the preset landing point value, current dynamic position information is set to the landing point position information.

In response to determining that the motion information is greater than or equal to the preset landing point value, the step of determining whether the motion information is less than the preset landing point value continues to be executed.

When the underwater environment detection device is at the landing point, that is, the underwater environment detection device is nearly in a static state, the motion information of the underwater environment detection device at this point is smaller than the motion information corresponding to a state of moving in the water. Therefore, whether the underwater environment detection device is already at the landing point can be determined by determining whether the motion information is less than the preset landing point value.

In an embodiment, the motion information includes acceleration information, and the step where whether the motion information is less than the preset landing point value is determined includes the following step: whether the acceleration information is less than the preset landing point value is determined.

During the motion of the underwater environment detection device, the underwater environment detection device has acceleration under the force of gravity. When the underwater environment detection device is located at the landing point, the underwater environment detection device does not continue to move downward because the underwater environment detection device is in contact with the bottom of the water, and the acceleration gradually decreases until the underwater environment detection device is nearly in a static state. Therefore, whether the underwater environment detection device is located at the landing point can be conveniently determined by determining whether the acceleration information is less than the preset landing point value.

In an embodiment, the motion information includes pressure information, and the step where the water situation information is determined includes the following step: the water depth information is determined based on the pressure information.

Since the underwater environment detection device is subjected to different pressures at different water depths, the information on the water depth at which the underwater environment detection device is located can be determined based on the pressure information. In other embodiments, the water depth information obtained based on the pressure information may be used to correct the water depth information determined based on the water entry position information and the dynamic position information when the underwater environment detection device is in the retracted state, thereby improving the accuracy of the water depth information.

For example, the step where the water entry position information is determined based on the motion information and current dynamic position information includes the following steps.

Whether a change amount of the motion information is greater than a preset water entry threshold is determined.

In response to determining that the change amount of the motion information is greater than the preset water entry threshold, the current dynamic position information is set to the water entry position information.

In response to determining that the change amount of the motion information is less than or equal to the preset water entry threshold, the step of determining whether the change amount of the motion information is greater than the preset water entry threshold continues to be executed.

As described above, when the underwater environment detection device just contacts the surface of the water, the surface of the water gives a resistance to the underwater environment detection device, and thus the motion information of the underwater environment detection device has a student change. Therefore, whether the underwater environment detection device is at the water entry position can be conveniently determined by determining whether the change amount of the motion information is greater than the preset water entry threshold.

In an embodiment, the motion information includes acceleration information, and the step where whether the change amount of the motion information is greater than the preset water entry threshold is determined includes the following step: whether a change amount of the acceleration information is greater than the preset water entry threshold is determined.

When the underwater environment detection device moves in the air, the acceleration of the underwater environment detection device is large, and when the underwater environment detection device just contacts the surface of the water, the acceleration of the underwater environment detection device decreases due to the resistance of the water. Therefore, whether the underwater environment detection device enters the water can be determined by determining whether the change amount of the acceleration information is greater than the preset water entry threshold.

In an embodiment, the motion information further includes pressure information, and the step where whether the change amount of the motion information is greater than the preset water entry threshold is determined includes the following step: whether a change amount of the pressure information is greater than the preset water entry threshold is determined.

When the underwater environment detection device just contacts the surface of the water, the resistance of the surface of the water applies a pressure to the underwater environment detection device, and thus the pressure applied to the underwater environment detection device at this point is greater than the pressure when the underwater environment detection device is in the air. Therefore, whether the underwater environment detection device enters the water can be conveniently determined based on the change amount of the pressure information.

In an embodiment, the preset water entry threshold includes a preset acceleration value and a preset pressure value, and the motion information includes acceleration information and pressure information; the step where whether the change amount of the motion information is greater than the preset water entry threshold is determined includes the following step: whether the change amount of the acceleration information is greater than the preset acceleration value and whether the change amount of the pressure information is greater than the preset pressure value are determined.

The step where in response to determining that the change amount of the motion information is greater than the preset water entry threshold, the current dynamic position information is set to the water entry position information includes the following steps.

In response to determining that the change amount of the acceleration information is greater than the preset acceleration value and that the change amount of the pressure information is greater than the preset pressure value, the dynamic position information is set to the water entry position information.

Since both the acceleration and the pressure of the underwater environment detection device are changed when the underwater environment detection device just contacts the surface of the water, whether the underwater environment detection device actually enters the water can be determined more accurately by determining both the change amount of the acceleration information and the change amount of the pressure information, and therefore, the accuracy of the obtained water entry position information is high.

FIG. 3 is a flowchart of an underwater environment detection method according to another embodiment of the present application. This embodiment of the present application may be based on Embodiments described above.

The motion information includes acceleration information, and the step where the water situation information is determined includes the following step: underwater terrain information is determined based on the acceleration information.

After the water situation information is associated with the dynamic relative position information to determine underwater environments at different positions, the method further includes the following steps.

A water situation graph is generated based on the water situation information and the dynamic relative position information that are associated with each other, and the water situation graph is transmitted to the mobile terminal.

As shown in FIG. 3, the method includes the steps S310 to S400.

In S310, motion information and dynamic position information of the underwater environment detection device detected by the detection apparatus are acquired.

In S320, initial position information is determined based on the motion information and the dynamic position information.

In S330, dynamic relative position information of the underwater environment detection device relative to the initial position is determined according to the dynamic position information and the initial position information.

In S340, water entry position information is determined based on the motion information and current dynamic position information.

In S350, the water entry position information is transmitted to a mobile terminal.

In S360, landing position information is determined based on the motion information and the dynamic position information.

In S370, whether the underwater environment detection device is in a retracted state is determined based on the motion information, when the underwater environment detection device is in a retracted state, water depth information is determined based on the water entry position information and the dynamic position information when the underwater environment detection device is in the retracted state, and underwater terrain information is determined based on acceleration information in the motion information.

When the underwater environment detection device moves along the bottom of the water, the underwater environment detection device continuously strikes the surface of the bottom of the water. When the underwater environment detection device strikes the bottom of the water with different compositions, due to different hardness of the bottom of the water with different compositions such as sediment, mud, gravel, hard bottom or rock, the waveform of the acceleration information of the bottom of the water may be different accordingly. Therefore, the terrain at different positions of the bottom of the water, that is, the underwater terrain information, can be obtained based on the acceleration information.

In S380, the water situation information is associated with the dynamic relative position information to determine underwater environments at different positions.

In S390, a water situation graph is generated based on the water situation information and the dynamic relative position information that are associated with each other.

The water situation graph refers to a graph that enables the user to see corresponding water situations at different underwater positions. When the user casts the underwater environment detection device in only one direction for water situation detection, the obtained water situation graph is a two-dimensional curve. When the user casts the underwater environment detection device in multiple directions for water situation detection, multiple two-dimensional water situation graphs can be fitted into a three-dimensional water situation graph to allow the user to conveniently determine the water situation at different underwater positions.

In S400, the water situation graph is transmitted to a mobile terminal.

The mobile terminal refers to a computer device that can be used during motion, and the mobile terminal includes a mobile phone, a laptop, a tablet computer, a POS machine and may also include an in-vehicle computer, a smartwatch, a smart bracelet, and smart glasses. By transmitting the water situation graph to the mobile terminal, the user can conveniently obtain the water situation graph through the mobile terminal to obtain the water situation at different underwater positions.

This embodiment is on the basis of the above Embodiments. In this embodiment, the motion information includes acceleration information, angular velocity information, and first position information, and the step where the motion information and the dynamic position information of the underwater environment detection device detected by the detection apparatus are acquired includes the following steps.

Acceleration information and angular velocity information of the underwater environment detection device detected by the detection apparatus are acquired; second position information is determined based on the acceleration information and the angular velocity information; first position information of the underwater environment detection device detected by the detection apparatus is acquired, where the first position information includes at least one of: GPS information or panoramic camera information; and the second position information is corrected based on the first position information to obtain corrected position information as the dynamic position information.

As shown in FIG. 4, step S310 includes steps S311 to S314.

In S311, acceleration information and angular velocity information of the underwater environment detection device detected by the detection apparatus are acquired.

In S312, second position information is determined based on the acceleration information and the angular velocity information.

In S313, first position information of the underwater environment detection device detected by the detection apparatus is acquired, where the first position information includes GPS information and/or panoramic camera information.

In S314, the second position information is corrected based on the first position information to obtain corrected position information as the dynamic position information.

The first position information includes the dynamic position information of the underwater environment detection device directly obtained by using a GPS positioning apparatus and/or a panoramic camera, the second position information refers to the dynamic position information of the underwater environment detection device calculated based on the acceleration information and the angular velocity information of the underwater environment detection device, and by correcting the second position information based on the first position information, the obtained dynamic position information can be relatively accurate.

In an embodiment, the first position information is obtained by the GPS positioning apparatus, and the second position information is obtained by the acceleration sensor and the angular velocity sensor. The sampling time interval of the GPS positioning apparatus is greater than the sampling time interval of the acceleration sensor and the angular velocity sensor. Assuming that the GPS positioning apparatus performs once a second, the acceleration sensor and the angular velocity sensor perform sampling once a microsecond. When the GPS positioning apparatus locates the dynamic position information of the underwater environment detection device at a certain time point, with the dynamic position information obtained by the GPS positioning apparatus as a starting point, the dynamic position information at the next time point is calculated based on the acceleration information and the angular velocity information to correct the second position information. According to the usage requirements, the first position information may also be obtained by the panoramic camera, the acceleration information and the angular velocity information may also be obtained by a nine-axis sensor, and the first position information and the second position information may be acquired by a variety of components.

In an embodiment, after whether the underwater environment detection device is in a retracted state is determined based on the motion information, the method further includes the following steps.

Whether the motion information is less than a preset end value is determined.

In response to determining that the motion information is less than the preset end value, detection is ended.

In response to determining that the motion information is greater than or equal to the preset end value, the step of determining whether the motion information is less than the preset end value is executed.

When the retraction of the underwater environment detection device is completed, the underwater environment detection device is nearly in a static state, and the motion information is small at this point. Therefore, by determining whether the motion information is less than the preset end value, whether the underwater environment detection device has been retracted and whether the current underwater environment detection process has been completed can be conveniently determined.

For example, the motion information includes acceleration information, and the step where whether the motion information is less than a preset end value is determined includes the following step: whether the acceleration information is greater than the preset end value is determined.

When the detection is ended, the acceleration of the underwater environment detection device is small. Therefore, by determining whether the acceleration information is less than the preset end value, whether the underwater environment detection device has been retracted and whether the current underwater environment detection process has been completed can be conveniently determined.

Figure 5:
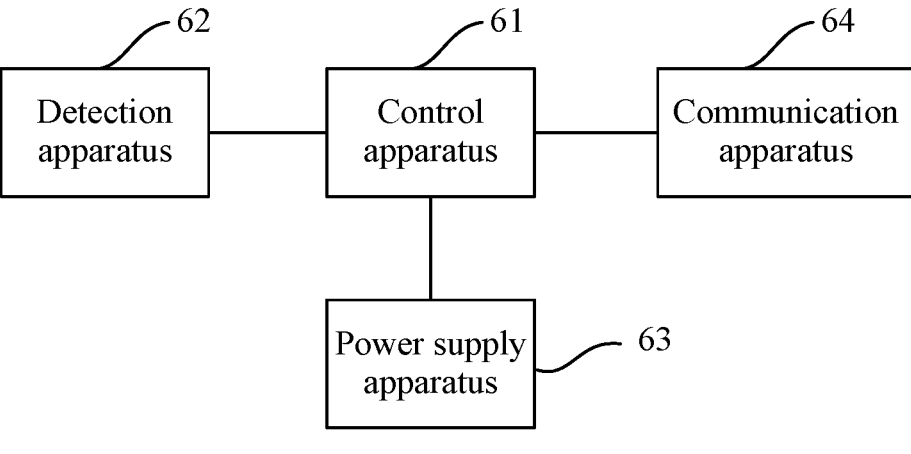
FIG. 5 is a structure diagram of an underwater environment detection device according to another embodiment of the present application.

FIG. 5 is a structure diagram of an underwater environment detection device according to another embodiment of the present application. As shown in FIG. 5, the underwater environment detection device includes a control apparatus 61 and a detection apparatus 62. The detection apparatus 62 is configured to detect motion information and dynamic position information of the underwater environment detection device, and the control apparatus 61 is configured to execute the underwater environment detection method in any of the embodiments of the present application.

The detection apparatus 62 can obtain the motion information and the dynamic position information of the underwater environment detection device. The control apparatus 61, by executing the underwater environment detection method in any of the embodiments of the present application, can determine the initial position information according to the motion information and the dynamic position information of the underwater environment detection device detected by the detection apparatus 62, determine the dynamic relative position information of the underwater environment detection device relative to the initial position, determine the water situation information when the underwater environment detection device is in a retracted state, associate the water situation information with the dynamic relative position information, and determine the underwater environments at different positions. The user can know the underwater environments at different positions only by performing a single operation to operate the underwater environment detection device into the water, and the operation is simple. Meanwhile, the underwater environment detection device only includes the control apparatus 61 and the detection apparatus 62 and thus is compact, light, low-cost, portable, and easy to operate.

The control apparatus 61 may be a central processing unit (CPU), a microcontroller unit (MCU) or a microprocessor.

When at least one program is executed by the control apparatus 61, the control apparatus 61 is enabled to implement the underwater environment detection method described above.

In an embodiment, the motion information includes acceleration information, and the detection apparatus 62 includes an accelerometer and/or an acceleration sensor. The accelerometer and the acceleration sensor are configured to detect the acceleration information of the underwater environment detection device, respectively.

The accelerometer is a meter for measuring the linear acceleration of a carrier. The acceleration sensor is a sensor capable of measuring acceleration. Through the accelerometer and/or the acceleration sensor included in the detection apparatus 62, the acceleration information of the underwater environment detection device can be conveniently detected.

On the basis of the embodiment described above, the motion information includes angular velocity information, and the detection apparatus 62 further includes an angular velocity sensor and/or a gyroscope. The angular velocity sensor and the gyroscope are configured to detect the angular velocity information of the underwater environment detection device, respectively.

The angular velocity sensor adopts the principle of Coriolis force, and a special ceramic apparatus is built into the angular velocity sensor, greatly simplifying the structure of the device and the circuit apparatus and providing superior operation characteristics. The angular velocity sensor is mainly applied to automotive navigation, position control, and attitude control of moving objects, and other scenarios where accurate angular measurement is required. The gyroscope is an apparatus for sensing and maintaining a direction and is designed based on the theory of the conservation of angular momentum. Once the gyroscope starts to rotate, due to the angular momentum of the wheel, the gyroscope tends to resist a change of direction. Through the angular velocity sensor and/or the gyroscope included in the detection apparatus 62, the angular velocity information of the underwater environment detection device can be conveniently detected.

On the basis of the embodiment described above, the detection apparatus 62 further includes a magnetometer. The magnetometer is configured to detect geomagnetic information of the underwater environment detection device.

The magnetometer refers to a vector-type magnetic sensor. The magnetometer is configured to measure the magnitude and the direction of the geomagnetic field. Therefore, through the magnetometer included in the detection apparatus 62, the component of the geomagnetic field strength vector of the position where the detection apparatus is located in the present system can be conveniently detected, and the angular velocity information can be corrected.

In an embodiment, the detection apparatus 62 includes a nine-axis sensor.

The nine-axis sensor refers to a combined sensor including a three-axis accelerometer, a three-axis gyroscope, and a three-axis magnetometer. Through the nine-axis sensor included in the detection apparatus 62, the angular velocity information, acceleration information, and geomagnetic information of the underwater environment detection device can be conveniently detected.

In an embodiment, the detection apparatus 62 includes at least one of: a GPS positioning apparatus, a panoramic camera, a pressure transducer, a temperature transducer, a dissolved oxygen sensor or a dissolved oxygen meter.

The GPS apparatus is an integrated circuit composed of a radio frequency (RF) chip, a baseband chip, a core CPU, and an associated peripheral circuit. The GPS apparatus, like other RF apparatus, is configured to receive signals, but the GPS apparatus is also configured to receive GPS information for positioning and navigation. The detection apparatus 62 includes a GPS positioning apparatus and can obtain the dynamic position information of the underwater environment detection device through the GPS positioning apparatus.

The operation of the panoramic camera is as follows: an optical image generated from a photographic field by a lens is projected onto the surface of an image sensor and converted into an electrical signal, the electrical signal is converted into a digital image signal by analog-to-digital conversion, the digital image signal is transmitted to a digital signal processor (DSP) for processing and then transmitted to a computer for processing through a Universal serial bus (USB) interface, and the image can be seen through a display. In the application of the panoramic camera, the distance can be measured by the panoramic camera. Therefore, the dynamic relative position information of the underwater environment detection device relative to the initial position can be determined based on the picture captured by the panoramic camera.

The pressure transducer is a device or apparatus that can sense a pressure signal and convert the pressure signal according to a certain rule into an electrical signal that is capable of being outputted. The pressure transducer generally consists of a pressure sensitive element and a signal processing unit. According to the different types of pressures to be tested, the pressure transducer can be divided into a gauge pressure transducer, a differential pressure transducer, and an absolute pressure transducer. Through the pressure transducer included in the detection apparatus 62, the pressure to which the underwater environment detection device is subjected can be detected, the water pressure at different positions can be obtained, and the water depth at different positions can be determined.

The temperature transducer refers to a sensor that can sense temperature and convert the temperature into a signal that is capable of being outputted. The temperature transducer is the core part of the temperature measurement instrument, and a large variety of temperature transducers are available. According to the measurement method, the temperature transducer can be divided into a contact-type temperature transducer and a non-contact temperature transducer, and according to the sensor material and electronic component characteristics, the temperature transducer can be divided into a thermal resistance temperature transducer and a thermocouple temperature transducer. Through the temperature transducer, the water temperature information at different positions underwater can be detected.

The dissolved oxygen sensor is a sensing device for measuring the amount of oxygen dissolved in water. Through the dissolved oxygen sensor, information on the amount of oxygen at different positions underwater can be detected.

The dissolved oxygen meter is a device for measuring dissolved oxygen in water. Oxygen in the dissolved oxygen meter passes through the diaphragm and is reduced by the working electrode to generate a diffusion current proportional to the oxygen concentration. By measuring the current, the concentration of dissolved oxygen in the water is obtained. Through the dissolved oxygen meter, information on the amount of oxygen at different positions underwater can be detected.

In an embodiment, the underwater environment detection device further includes a power supply apparatus 63. The power supply apparatus 63 is electrically connected to the control apparatus 61, and the power supply apparatus 63 is configured to supply power to the control apparatus 61.

The power supply apparatus 63 refers to an electric apparatus capable of supplying power to the control apparatus 61. In an embodiment, the power supply apparatus 63 may include a battery. The battery, for example, may be a lithium battery, and the number of lithium batteries, for example, may be two. According to the use requirements, the power supply apparatus 63 may include other components as long as the power supply apparatus 63 can satisfy the requirement of supplying power to the control apparatus 61.

According to the scenario, the battery may be removable, fixed, rechargeable, or non-rechargeable. In an embodiment, when the power supply apparatus 63 employs two small lithium batteries, the underwater environment detection device may work continuously for more than one year. In practical application, the underwater environment detection device has an activation mode and a sleep mode. When the acceleration information changes, the underwater environment detection device enters the activation mode, and when the acceleration information does not change, the underwater environment detection device enters the sleep mode, thereby achieving the effect of saving electric energy.

In an embodiment, the underwater environment detection device further includes a communication apparatus 64. The control apparatus 61 is electrically connected to the communication apparatus 64, and the control apparatus 61 is configured to communicate with a mobile terminal through the communication apparatus 64.

The communication apparatus 64 refers to an apparatus having a communication function. Through the communication apparatus 64 included in the underwater environment detection device, the control apparatus 61 can exchange data with the mobile terminal through the communication apparatus 64 so that the control apparatus 61 can send the obtained water situation information at different positions to the mobile terminal. In this manner, the user can know the water situation through the mobile terminal and can determine the swimming layer of the target fish swarm.

For example, the communication apparatus 64 includes at least one of a Bluetooth apparatus or a wireless local area network apparatus such as a Wireless Fidelity (Wi-Fi) apparatus.

The Bluetooth technology is a global specification for wireless data and voice communication openness, and the Bluetooth technology is a special short-range wireless technology connection for establishing a communication environment for fixed and mobile devices based on a low-cost short-range wireless connection. Bluetooth enables some current portable mobile devices and computer devices to connect to the Internet without a cable and to wirelessly access the Internet. The Bluetooth apparatus refers to a circuit apparatus including the Bluetooth technology. Through the Bluetooth apparatus included in the communication apparatus 64, the underwater environment detection device can conveniently communicate with the mobile terminal.

The Wi-Fi apparatus refers to an apparatus having a wireless communication technique, and the wireless communication is a communication mode in which information is exchanged using a characteristic that an electromagnetic wave signal can propagate in a free space. Through the Wi-Fi apparatus included in the communication apparatus 64, the underwater environment detection device can conveniently communicate with the mobile terminal.

In an embodiment, when the underwater environment detection device is applied to the fishing scenario, in actual production, the size of the underwater environment detection device may be controlled to the size of an artificial bait, and the underwater environment detection device can be placed in an artificial bait box of the user and thus becomes easy to carry. In addition, the weight of the underwater environment detection device may be controlled to 5-100 g, 5-50 g, or 8-30 g. For example, the weight of the underwater environment detection device may be one of 10 g, 20 g, 30 g or 40 g, which facilitates long-distance spot casting for most specifications of lure fishing and makes the casting performance of the underwater environment detection device good.

Meanwhile, the underwater environment detection device has an outer casing. The casing is made of a material with good hardness and corrosion resistance to avoid damage caused by seawater corrosion or casting errors on the surface of rocky hard objects and has strong durability.

The embodiments of the present application further provide an underwater environment detection system which comprising an underwater environment detection device, and at least one processor, and a memory, where the memory is used to store a computer program, the at least one processor is used to execute the computer program, to implement:

acquiring motion information and dynamic position information of an underwater environment detection device;

determining information of an initial position based on the motion information and the dynamic position information;

determining, according to the dynamic position information and the initial position information, dynamic relative position information of the underwater environment detection device relative to the initial position;

determining water situation information; and associating the water situation information with the dynamic relative position information to determine underwater environments at different positions.

In some embodiments, the underwater environment detection device is communicatively connected with a mobile terminal. The at least one processor may be provided in the underwater environment detection device and/or the mobile terminal.

The at least one processor provided in the underwater environment detection device may be used to control the underwater environment detection device to perform the following steps: controlling the underwater environment detection device to obtain motion information and dynamic position information of the underwater environment detection device, and sending the motion information and the dynamic position information to the mobile terminal.

The at least one processor provided in the mobile terminal may be used to control the mobile terminal to perform the following steps: receiving the motion information and the dynamic position information from the underwater environment detection device to determine initial position information; based on the motion information and the dynamic position information to determine initial position information; according to the dynamic position information and the initial position information, determine the dynamic relative position information of the underwater environment detection device relative to the initial position; determine water situation information; and associating the water situation information with the dynamic relative position information to determine underwater environments at different positions.

The embodiments of the present application further provide a fishing rod. The fishing rod includes a fishing hook, a fishing line, and the underwater environment detection device in any of the embodiments of the present application. The underwater environment detection device is detachably disposed at the end of the fishing line and/or the fishing hook.

The detachable arrangement may be implemented in a variety of manners, for example, a threaded connection, a key connection, a pin connection, a riveting connection, and a sliding connection in which two pieces are fastened to each other.

By detachably disposing the underwater environment detection device on the end of the fishing line and/or on the fishing hook, the underwater environment detection device can enter the water along with the fishing hook and/or the end of the fishing line by casting the fishing hook into the water. When the fishing hook is retracted, the underwater environment detection device is also retracted. In this manner, the underwater environment detection device becomes convenient to use and portable. Since the underwater environment detection device is detachably connected to the fishing hook and/or the end of the fishing line, the underwater environment detection device can also be used in conjunction with another fishing rod when one fishing rod is damaged. In this manner, the underwater environment detection device is easy to recycle and has strong environmental friendliness.

The embodiments of the present application further provide a non-transitory computer-readable storage medium. The computer-readable storage medium is configured to store a computer program, and the computer program is configured to execute the method described above.

All or part of the processes in the methods in the above-mentioned embodiments may be implemented by executing relevant hardware through a computer program. The program may be stored in a non-transient computer-readable storage medium. The program, when executed, may include the processes in the methods in the above-mentioned embodiments. The non-transient computer-readable storage medium may be a magnetic disk, an optical disk, a read-only memory (ROM) or a random access memory (RAM).

What is claimed is:

1. An underwater environment detection method, applied to an underwater environment detection system, wherein the underwater environment detection method comprises:

acquiring motion information and dynamic position information of an underwater environment detection device;

determining initial position information based on the motion information and the dynamic position information;

determining, according to the dynamic position information and the initial position information, dynamic relative position information of the underwater environment detection device relative to the initial position;

determining water situation information; and associating the water situation information with the dynamic relative position information to determine underwater environments at different positions, wherein the determining initial position information based on the motion information and the dynamic position information comprises:

determining whether the motion information is greater than a preset start value:

in response to determining that the motion information is greater than the preset start value, setting current dynamic position information to the initial position information.

2. The underwater environment detection method according to claim 1, wherein the water situation information comprises at least one of: underwater terrain information, water depth information, water temperature information, water pressure information or oxygen content information.

3. The underwater environment detection method according to claim 1, before the determining water situation information, further comprising:

determining, based on the motion information, whether the underwater environment detection device is in a retracted state.

4. The underwater environment detection method according to claim 3, wherein the determining, based on the motion information, whether the underwater environment detection device is in a retracted state comprises:

determining whether the motion information is greater than a preset retraction value;

in response to determining that the motion information is greater than the preset retraction value, determining that the underwater environment detection device is in the retracted state.

5. The underwater environment detection method according to claim 3, before the determining, based on the motion information, whether the underwater environment detection device is in a retracted state, further comprising:

determining landing point position information based on the motion information and the dynamic position information.

6. The underwater environment detection method according to claim 5, wherein the determining landing point position information based on the motion information and the dynamic position information comprises:

determining whether the motion information is less than a preset landing point value;

in response to determining that the motion information is less than the preset landing point value, setting current dynamic position information to the landing point position information.

7. The underwater environment detection method according to claim 3, before the determining, based on the motion information, whether the underwater environment detection device is in a retracted state, further comprising:

determining water entry position information based on the motion information and current dynamic position information; and wherein the determining water situation information comprises:

determining water depth information based on the water entry position information and dynamic position information when the underwater environment detection device is in the retracted state.

8. The underwater environment detection method according to claim 7, after determining water entry position information based on the motion information and current dynamic position information, further comprising:

transmitting the water entry position information to a mobile terminal.

9. The underwater environment detection method according to claim 7, wherein the determining water entry position information based on the motion information and current dynamic position information comprises:

determining whether a change amount of the motion information is greater than a preset water entry threshold;

in response to determining that the change amount of the motion information is greater than the preset water entry threshold, setting the current dynamic position information to the water entry position information.

10. The underwater environment detection method according to claim 9, wherein the motion information comprises acceleration information; and wherein the determining whether a change amount of the motion information is greater than a preset water entry threshold comprises:

determining whether a change amount of the acceleration information is greater than the preset water entry threshold.

11. The underwater environment detection method according to claim 1, wherein the motion information comprises acceleration information; and wherein the determining whether the motion information is greater than a preset start value comprises:

determining whether the acceleration information is greater than the preset start value.

12. The underwater environment detection method according to claim 11, wherein the motion information further comprises angular velocity information; and wherein the acquiring motion information and dynamic position information of the underwater environment detection device comprises:

acquiring acceleration information and angular velocity information of the underwater environment detection device; and determining the dynamic position information based on the acceleration information and the angular velocity information.

13. The underwater environment detection method according to claim 6, wherein the motion information comprises acceleration information, and wherein the determining whether the motion information is less than a preset landing point value comprises:

determining whether the acceleration information is less than the preset landing point value.

14. The underwater environment detection method according to claim 1, wherein the motion information comprises acceleration information, and wherein the determining water situation information comprises:

determining underwater terrain information based on the acceleration information.

15. The underwater environment detection method according to claim 1, after associating the water situation information with the dynamic relative position information to determine underwater environments at different positions, further comprising:

generating a water situation graph based on the water situation information and the dynamic relative position information that are associated with each other; and transmitting the water situation graph to the mobile terminal.

16. The underwater environment detection method according to claim 1, wherein the motion information comprises acceleration information, angular velocity information, and first position information, and wherein the acquiring motion information and dynamic position information of the underwater environment detection device comprises:

acquiring acceleration information and angular velocity information of the underwater environment detection device;

determining second position information based on the acceleration information and the angular velocity information;

acquiring first position information of the underwater environment detection device, wherein the first position information comprises at least one of: Global Positioning System (GPS) information or panoramic camera information; and correcting the second position information based on the first position information to obtain corrected position information as the dynamic position information.

17. The underwater environment detection method according to claim 1, further comprising:

determining whether the motion information is less than a preset end value;

in response to determining that the motion information is less than the preset end value, end detection.

18. An underwater environment detection system, comprising an underwater environment detection device, and at least one processor, and a memory, wherein the memory is used to store a computer program, the at least one processor is used to execute the computer program, to implement:

acquiring motion information and dynamic position information of an underwater environment detection device;

determining initial position information based on the motion information and the dynamic position information;

determining, according to the dynamic position information and the initial position information, dynamic relative position information of the underwater environment detection device relative to the initial position;

determining water situation information; and associating the water situation information with the dynamic relative position information to determine underwater environments at different positions, wherein the determining initial position information based on the motion information and the dynamic position information comprises:

determining whether the motion information is greater than a preset start value;

in response to determining that the motion information is greater than the preset start value, setting current dynamic position information to the initial position information.

19. A non-transitory computer-readable storage medium, wherein the computer-readable storage medium is configured to store a computer program, and the computer program, when executed by a processor, implements the underwater environment detection method according to claim 1.

* * * * *